United States Patent [19]

Janner et al.

[11] 4,401,627

[45] Aug. 30, 1983

[54] DEVICE FOR IRRADIATING ISOTOPE MIXTURES ISOTOPE -SELECTIVELY

[75] Inventors: Karl Janner, Erlangen; Klaus Gregorius, Neunkirchen, both of Fed. Rep. of Germany

[73] Assignee: Kraftwerk Union Aktiengesellschaft, Mülheim (Ruhr), Fed. Rep. of Germany

[21] Appl. No.: 186,286

[22] Filed: Sep. 11, 1980

[30] Foreign Application Priority Data

Sep. 28, 1979 [DE] Fed. Rep. of Germany ....... 2939506

[51] Int. Cl.³ .............................................. B01J 19/08
[52] U.S. Cl. ........................................ 422/186; 55/17
[58] Field of Search ................ 215/DIG. 2; 422/186; 55/17

[56] References Cited

U.S. PATENT DOCUMENTS

| | | | |
|---|---|---|---|
| 4,014,666 | 3/1977 | Wang | 55/17 |
| 4,025,790 | 5/1977 | Jetter et al. | 250/284 |
| 4,235,606 | 11/1980 | Becker et al. | 55/17 |
| 4,286,153 | 8/1981 | Janner et al. | 250/281 |

FOREIGN PATENT DOCUMENTS

| | | | |
|---|---|---|---|
| 794834 | 5/1958 | United Kingdom | 250/93 |
| 1550049 | 8/1979 | United Kingdom . | |

*Primary Examiner*—Brooks H. Hunt
*Attorney, Agent, or Firm*—Herbert L. Lerner; Laurence A. Greenberg

[57] ABSTRACT

Apparatus for adiabatic expansion and selective irradiation of gaseous isotope mixture employing a device in which there is a concentric arrangement of nozzles and diffusers with irradiation of the gas in the annular gap between the two. The nozzles are in the form of a multiplicity of slit nozzles with mutually parallel axes on an imaginary cylinder surface. Gas enters and flows centrally in the cylinder. Gas from the diffusers is discharged. Radiation enters through a mirror into the annular gap.

8 Claims, 10 Drawing Figures

FIG. 3 is a modified form of apparatus shown in FIG. 2, differing principally from the latter in that the diffusor gaps do not extend perpendicularly to the symmetry axis but parallel thereto.

FIG. 4 is an enlarged cross section of an individual nozzle shown in FIG. 1.

FIG. 5 is an enlarged cross section of ring-shaped slot diffusors in FIG. 1, showing the individual ring elements on top of each other and held by rigid intermediate bodies.

FIG. 6 is an enlargment to particularly show the leaf springs for holding the diffusors at a desired spacing.

FIGS. 7 and 8 show a cross section and longitudinal section of an apparatus variant directed particularly to selective condensation and separation of the enriched or depleted gas mixture due to the mass differences.

FIGS. 9 and 10 show a cross section and longitudinal section modified apparatus in which the diffusors are not parallel to the axis but perpendicular thereto.

DETAILED DESCRIPTION OF THE INVENTION

The device, according to the invention, has a multiplicity of slit nozzles arranged with mutually parallel axes on an imaginary cylinder surface, which is arranged in a housing with a central gas inlet opening and at least one gas outlet opening, a concentric radiation zone, radiation entering through a window and forming a cylinder surface around the slot nozzles. Concentrically thereto a multiplicity of diffusers is provided. This, therefore, involves a concentric arrangement of nozzles and diffusors, where the irradiation of the flowing-through gas mixture takes place in the annular gap between the two. For illustrating this device principle in greater detail, two design variants will be described in the following with the aid of FIGS. 1 to 10. The first variant is suited for isotope separation by means of a chemical process. The second is suited for isotope separation on the basis of the above-described mass difference between condensed and uncondensed particles. Common to both apparatus variants is the design of the slit nozzles.

The first apparatus variant is shown in FIG. 1 in a cross section and in FIG. 2 in a longitudinal section. Details are shown in FIGS. 4 to 6. This apparatus is suitable for performing an isotope separation, for instance, with $UF_6$ according to the principle of a selective chemical reaction with a supplemental gas which is fed-in simultaneously with the isotope mixture. For the adiabatic expansion of this gas mixture, there is provided a multiplicity of long slot nozzles 2 which, according to FIGS. 1 and 2, are arranged in circular fashion. For manufacturing reasons, the nozzles are made, as shown in FIG. 2, in shorter sections 1 and are then mutually centered by means of the centering rings 25 and dowel pins 26 and are mounted in the housing 16 via the socket 18 and the clamping yoke 19. This rigid mounting is achieved by means of a central screw 12. The feeding-in of the gas mixture into the interior of the nozzle insert is provided via a central nozzle 20. A cross section through an individual nozzle is shown in FIG. 4. With this nozzle construction, the gas mixture flows radially through the axis-parallel slot nozzles 2 which are formed by the nozzle wall profile 1, and is cooled down in the process in the desired manner. The shape of the nozzle and the nozzle profile contour radius are matched to each other in such a way that the compression shock, which normally occurs when two adjacent gas jets meet, is largely avoided. In shortened parallel jet nozzles this is the case if the exit angle $\alpha$ of the gas jet, see FIG. 4, to the axis of the nozzle is equal to one half the pitch angle $\beta$ of the nozzle arrangement. The boundary layers, which are very thin in the case of shortened narrow nozzles, are accelerated and cooled, after leaving, by the indisturbed gas jet. This furthermore provides homogenization which has a favorable effect in the selective excitation by the laser beam and in the subsequent pressure recovery period. The annular space around this cylindrical nozzle unit represents the irradiation space and for that purpose, the end face of the apparatus is closed off gastight by a window 13 and a corresponding mounting ring 17. The irradiation unit proper, i.e. for instance a laser, is not shown; it generates a laser beam 15 of annular cross section which, as shown, goes through the irradiation space and is reflected at the end thereof by a mirror 14 inserted there. This mirror 14 may also be constructed from a multiplicity of mirror elements or have facets, so that reflection back and forth of the incident laser beam is obtained and thereby, an improved utilization of the beam for excitation.

This radiation space in turn is surrounded by a multiplicity of ring-shaped slot diffusors 5, which are arranged on top of each other and are built-up according to FIG. 5 of individual ring elements 3 and are held by leaf-springs 4 as well as rigid intermediate bodies 31 at their respective desired spacing. Two rings 3 each form a diffusor canal which is first narrowed down from the entrance side, the pressure being increased. At the narrow point, the velocity drops to or below the velocity of sound and subsequently the diffusor canal becomes wider again. The entrance edges of the rings are made with sharp corners. Since a rigid diffusor, as is well known, cannot be designed for maximum pressure recovery because of the unfavorable starting behavior, the distance between the rings is adjustable within limits. This is accomplished by the pressure plate 8 which is connected by tie rods 7 to the lower tie plate 9 which, in turn, is adjustable relative to the housing by means of the nut 6. The adjustability is limited by the spacers 31 which at the same time also protect the leaf springs 4, which at first maintain a larger distance of the rings 3, against excessive deformation. When starting the diffusers, i.e. at the beginning of the enrichment process, the individual rings 3, according to FIG. 6, are set by the leaf-springs 4 to a larger mutually spacing. The ratio of the cross section of the narrow canal point F2 to the canal entry area F1 is then so large that the diffusor starts, i.e. F2/F1 is approximately 0.7. When the diffuser has been started, the ring spacings of the diffuser discs 3 are narrowed down to approximately the value with the maximum pressure recovery by tightening the nut 6. The ratio F2/F1 is then approximately 0.5. The most suitable conditions F2/F1 are best determined experimentally for the respective diffuser arrangement.

The tie rods 7 serve not only for adjusting the spacing of the individual diffuser rings 3, they also form with the already mentioned end rings 8 and 9, a cage for the radial guidance of the diffuser parts. To avoid sliding seals between the parts 18 and 7 which are movable relative to each other, spring bellows 10 are provided.

The partially converted isotope mixture, which leaves the diffusers 5, is collected in the ring space outside thereof in the housing 16 and flows off via the nozzle 11. From there, it is transported into one of the known devices, not shown, in which the separation of

DEVICE FOR IRRADIATING ISOTOPE MIXTURES ISOTOPE-SELECTIVELY

BACKGROUND OF THE INVENTION

1. Field of the Invention

The present invention relates to apparatus for the isotope-selective irradiation and adiabatic expansion of gaseous isotope mixtures to which also supplemental gases of an active or neutral type can be added, with a coherent electromagnetic radiation source tuned to a suitable frequency, preferably of a laser, for enriching one isotope in the isotope mixture.

2. Description of the Prior Art

Various enrichment methods known per se can be carried out with such an apparatus for the isotope specific excitation. Of special current interest for the manufacture of nuclear fuel for nuclear power stations is the enrichment of the uranium isotope 235 to a content of about 3 to 4% versus a natural content of only 0.7% as the starting material. Many of the proposals known to date amount to bringing of uranium isotope or its compound as $UF_6$ by laser excitation into a more highly excited, i.e. higher—energy state and to enable it thereby to enter into a chemical reaction, preferably with a reaction partner, and to separate the reaction products stemming therefrom from the original gas mixture for instance by physical means. It has been found to be particularly advantageous to cool down the gaseous isotope mixture to be fed-in by adiabatic expansion, desirably to 30–50 K., since in this manner a clear separation of the spectra about the isotope shift, particularly in the Q-branches of the $UF_6$ occurs. This, in turn, makes possible a selective coverage of only the one isotope compound by means of a laser beam the frequency of which is set accordingly.

For a further explanation of an isotope separation or enrichment method of this type, reference is made to German Published Patent Application P No. 24 47 762, corresponding U.S. patent application, Ser. No. 614,213.

In addition to these chemical reactions made possible by laser excitation, the expansion conditions can be chosen so that condensation occurs in the gas jet. The 235 $UF_6$ molecules is prevented from such condensation by isotope-specific laser excitation or from adsorption at condensing or already condensed particles. The large mass difference between the particles unchanged in the original gas jet and those produced therein can then be utilized for separating the same by physical means, as is proposed, for instance, in the German applications P No. 26 59 590, corresponding U.S. patent application Ser. No. 862,504 and P No. 28 49 162, corresponding U.S. patent application Ser. No. 089,520.

With both basic methods, adiabatic cooling-down of the gaseous starting materials, for instance $UF_6$, is necessary. The nozzles required therefor must cause a very strong expansion so that the irradiation of the isotope mixture for the isotope-specific excitation can be performed prior to the condensation of the $UF_6$. This is achieved by supersonic nozzles which are very narrow at their smallest cross section, then are greatly enlarged and impart to the gas jet the desired form without shock, as fast as possible. A disadvantage is the development of a boundary layer at the walls of the nozzle, since the temperature rise caused by friction and heat inflow reduces the selectivity of the desired process and also adversely influences the pressure recovery in following diffusers.

To diminish these detrimental effects, it has been proposed to suction off the boundary layer; see German Patent Application P No. 28 10 444, corresponding U.S. patent application Ser. No. 018,230, or to thermally insulate or additionally cool the nozzle wall, as is proposed in German patent application P No. 28 05 958. Also connecting many short slit nozzles with interposed neutral gas layers in parallel, as proposed in German patent application P No. 29 23 811, corresponding U.S. patent application Ser. No. 149,720, aims in this direction.

All these proposals require a large expenditure of technical means so that the problem arose to conceive an apparatus for the adiabatic expansion and subsequent irradiation, which is of relatively simple mechanical design and has only a small boundary layer component in the gas flow to be irradiated. At the same time, a high gas throughput should be possible with such an apparatus while simultaneously avoiding stagnant gas layers.

SUMMARY OF THE INVENTION

With the foregoing and other objects in view, there is provided in accordance with the invention an apparatus for adiabatic expansion and isotope-selective irradiation of gaseous isotope mixtures to which supplemental gas may be added, with a coherent electromagnetic radiation source tuned to a suitable frequency for the purpose of enriching one isotope in the isotope mixture, which comprises a housing, a central gas inlet opening in said housing for passage of entering gaseous isotope mixtures centrally through said housing, a multiplicity of radially-directed slot nozzles in the housing which are arranged axis-parallel to each other on an imagined cylinder surface encircling said central passage of gaseous isotope mixtures through the housing, a radiation zone which forms a cylinder surface around said slot nozzles, a radiation window in said housing for the passage of radiation into said radiation zone, a multiplicity of diffusors concentric with said cylinder surface of the slot nozzles arranged around said radiation zone, and at least one gas outlet in said housing for discharge of gases from said diffusors.

Other features which are considered as characteristic for the invention are set forth in the appended claims.

Although the invention is illustrated and described herein as embodied in a device for irradiating isotope mixtures isotope-selectively, it is nevertheless not intended to be limited to the details shown, since various modifications may be made therein without departing from the spirit of the invention and within the scope and range of equivalents of the claims.

BRIEF DESCRIPTION OF THE DRAWINGS

The invention however, together with additional objects and advantages thereof will be best understood from the following description when read in connection with the accompanying drawings, in which.

the various chemical components such, as for instance, UF$_6$ or UF$_5$ as well as supplemental gas such as hydrogen or argon, is performed. These processes can be taken, among others, from the state of the art mentioned at the outset, so that a repetition of these known process cycles can be dispensed with.

Figure 1:
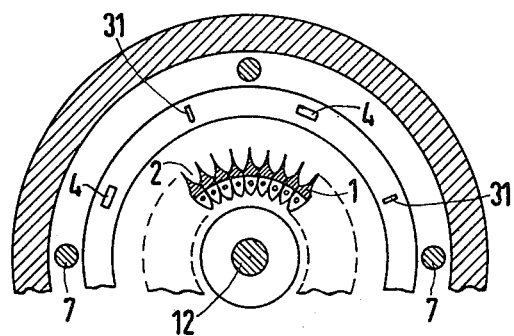
FIG. 1 diagrammatically illustrates apparatus in partial cross section in accordance with the invention in which is shown the nozzles surrounded by a radiation zone which in turn is surrounded by diffusors.
Figure 2:
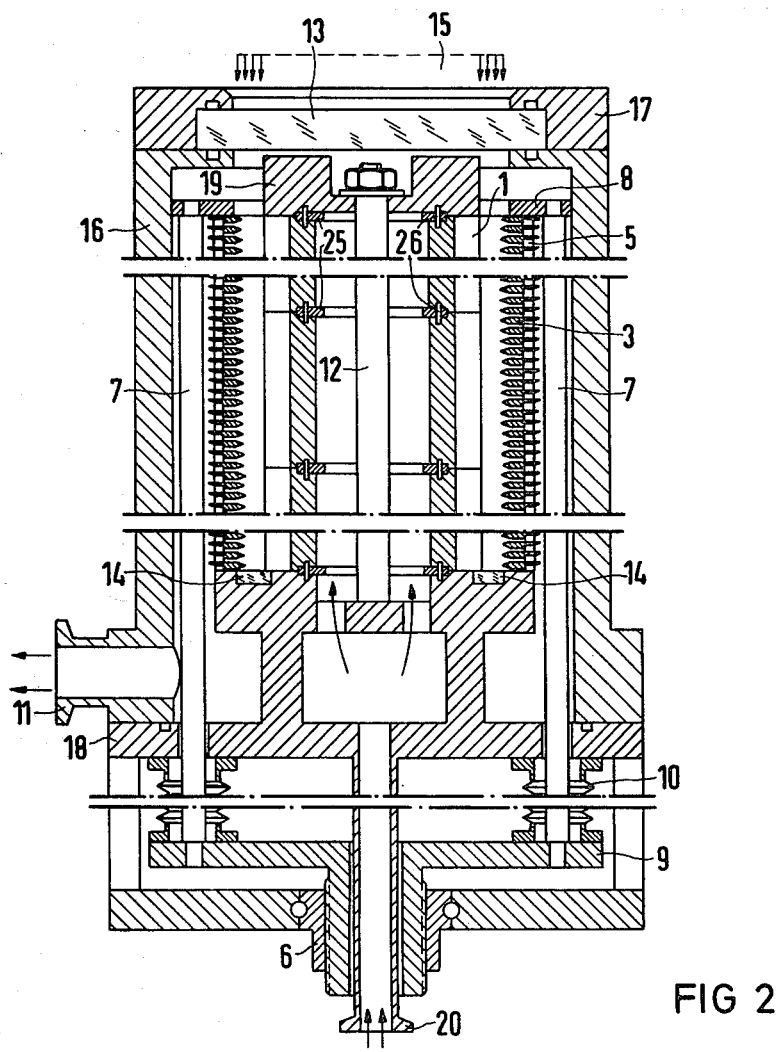
FIG. 2 is a longitudinal section of the apparatus in FIG. 1 showing the overall construction and assembly of nozzles, diffusors, window, mirrors and other component parts in a housing provided with a gas inlet and a gas outlet.
Figure 3:
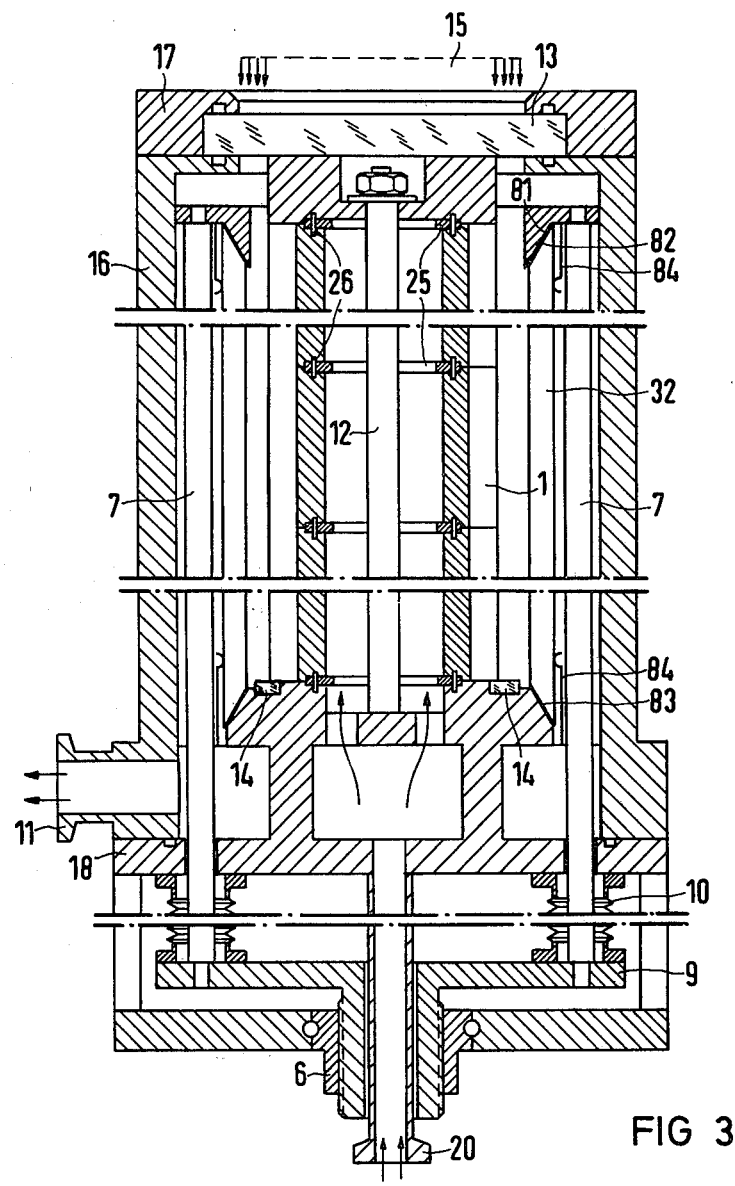
Figure 4:
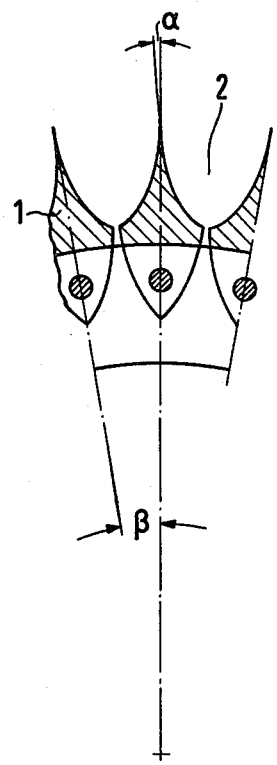
Figure 5:
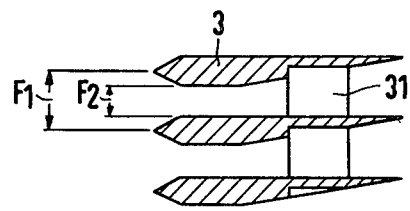
Figure 6:
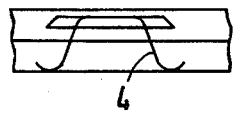

The design principle, shown in FIG. 2, can, of course, also be modified. One variant is shown in FIG. 3. There, the diffuser gaps do not extend perpendicularly to the symmetry axis but parallel thereto. The cross section of the individual diffuser elements 32 corresponds approximately to that of the elements 3 according to FIG. 5. They are supported at the conical surfaces 82 and 83 of the pressure plate 81 or the socket 18 in grooves along the generatrix lines thereof and their mutual azimuthal spacing can thereby be adjusted via the motion of the nut 6 which, as already mentioned, is important for the starting of the diffuser. Tab springs 84 or other equivalent parts provide that the elements 32 always remain in engagement with the grooves on the surfaces 82 and 83. Additional parts, which are advantageous for securing an accurate parallel shift of the diffuser elements 32 are not shown for reasons of clarity since they are not important for the essence of the present invention.

Figure 7:
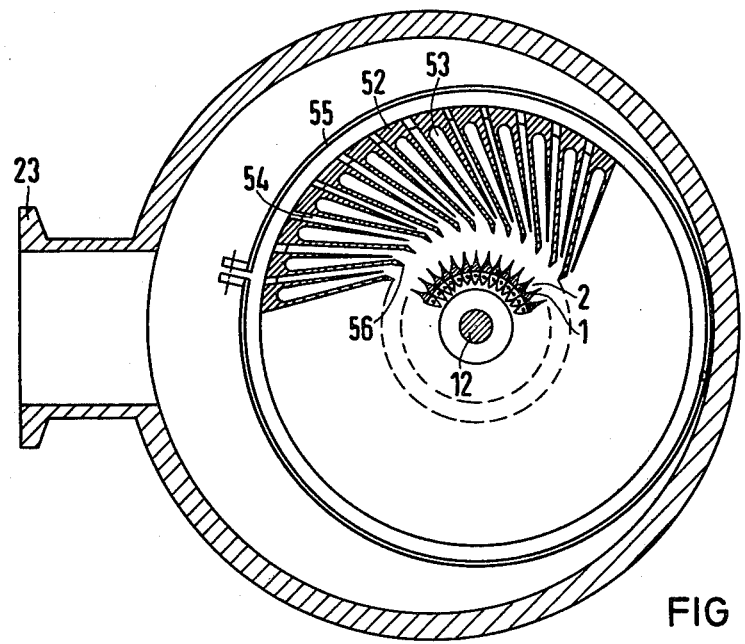
Figure 8:
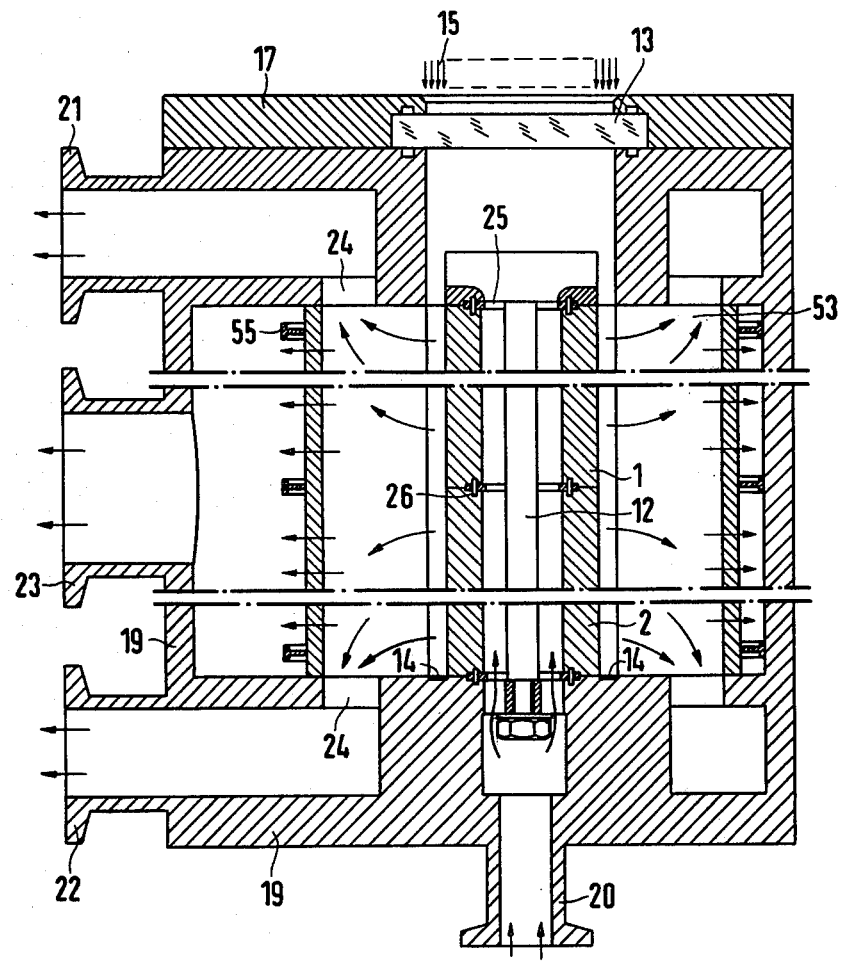

The apparatus variant shown in FIGS. 7 and 8 in cross section and longitudinal section, respectively, makes possible isotope separation or enrichment via selective condensation and separation of the enriched or depleted components of the gas mixture leaving the irradiation zone, due to the mass differences. A chemical conversion of the fed-in substances therefore does not take place. The principle of operation of this separation method was also described at the outset in the cited state of the art (German patent application P No. 28 49 162). The diffuser arrangement for deflecting the gas flow described there is also used in this apparatus variant. It surrounds in a circular arrangement the expansion nozzles 2 as well as the irradiation space. This circular diffusor arrangement consists of individual elements 52, which are lined up according to FIG. 7 with spacings and are held together by wrappings 55. The spacer elements can be inserted as individual parts or may also be integrated into the bodies 52. They are designed so that the gas stream with the heavier particles can issue unimpeded from the spaces 54 between the individual elements 52 into the collecting space, which is surrounded by the housing 19. At this housing, a nozzle 23 is provided, through which these substance mixture parts which are depleted of the excited isotope, can be discharged. The spaces 53 which are formed by the walls of the individual parts 52 and are closed toward the collecting space described conduct the substance mixture which is enriched with the excited isotope to the two axial ends and, via corresponding openings in the housing 24, to the discharge canals and nozzles 21 and 22 to which collecting tanks for the enriched substance mixture are connected in a manner not shown.

Since the physical separation effect, which can be attained with this apparatus, between lighter and heavier components of the gas flow leaving the radiation space depends very substantially on the direction of deflection by the individual elements 52, their setting angle relative to the radial rays emanating from the center of the nozzle unit must be determined experimentally on individual models. The same applies to the development of the knife edges 56 which are opposite the respective discharge nozzles 2.

Figure 9:
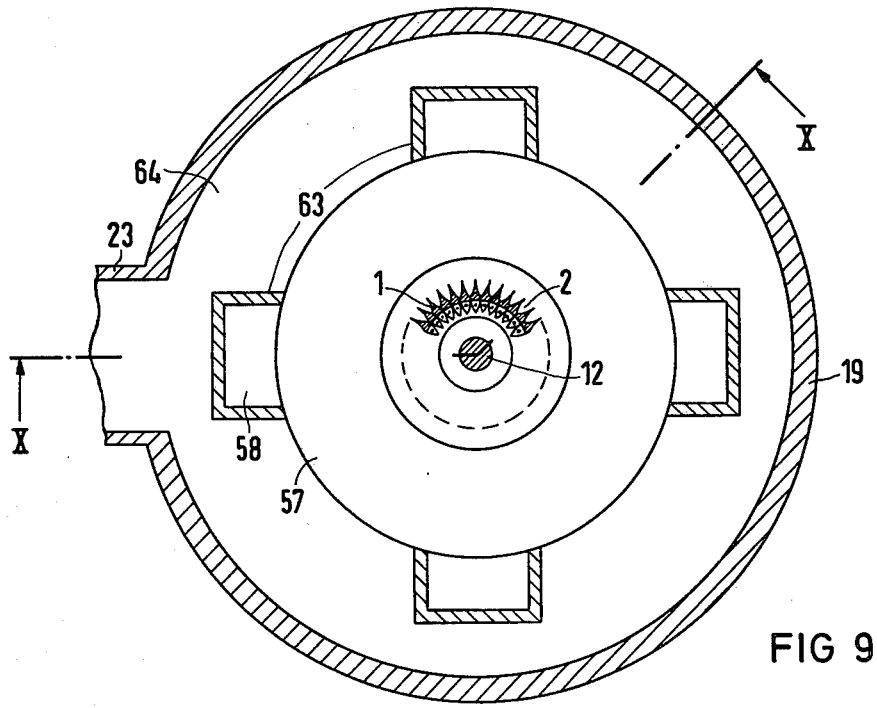
Figure 10:
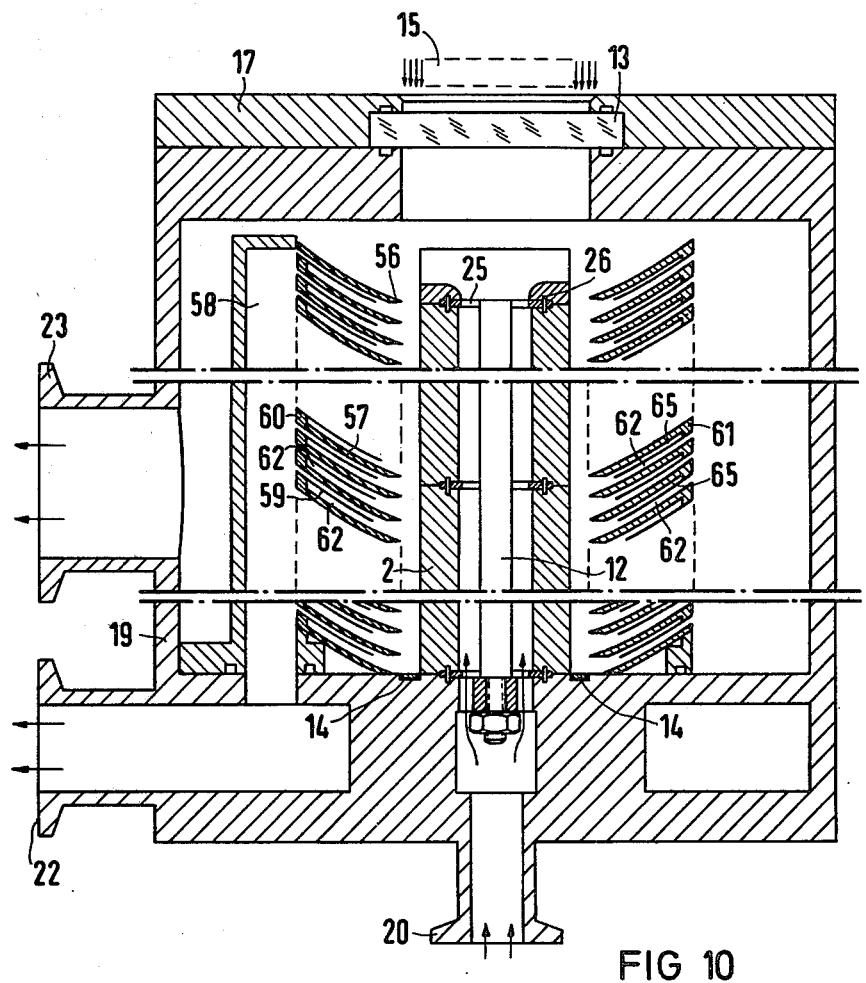

According to FIGS. 9 and 10, this apparatus can also be modified so that the deflection edges 56 of the diffuser are not parallel to the axis but perpendicular thereto. The diffuser is, therefore, constructed from a stack of annular and approximately conical discs 57 and 59, which are kept at a spacing by intermediate pieces 60 and 61. The component enriched with the desired isotope with respect to the different mass ratio of the gas mixture flows into the vertical collecting canals 58 connected to the diffuser stack and from there to the discharge nozzles 22 of the ring-shaped housing 19. The spaces 62 between the disc 59 and 57 are closed in the region of the collecting canals 58 by intermediate pieces 60, see the left-hand side of FIG. 9. The depleted mixture collecting in these spaces flows in the sectors 63 between the canals 58 into the ring-shaped collecting space 64 and from there to the discharge nozzle 23. For this purpose, the spaces which are closed in the area of the canals 58, are open there but the respective adjacent spaces 65 are closed by spacers 61, see the right-hand side of FIG. 10, which represents a cross section along the line X—X of FIG. 9. The spacers 60 and 61 can be integrated with the discs 57 and 59 or also represent separate parts, which are inserted only when the apparatus is assembled.

In summary, it can be said that the concentric arrangement of nozzles and diffusers in both apparatus variants facilitates the centering and mutual correlation and creates everywhere uniform flow conditions. Even so, it would, of course, also be possible to choose other cross sectional shapes, for instance, only segments. The latter shapes suggest themselves particularly for design tests for determining the optimum conditions for the respective planned enrichment method.

We claim:

1. Apparatus for adiabatic expansion and isotope-selective irradiation of gaseous isotope mixtures to which supplemental gas may be added, with a coherent electromagnetic radiation source tuned to a suitable frequency for the purpose of enriching one isotope in the isotope mixture, which comprises a housing, a central gas inlet opening in said housing for passage of entering gaseous isotope mixtures centrally through said housing, a multiplicity of radially-directed slot nozzles in the housing which are arranged axis-parallel to each other on an imagined cylinder surface encircling said central passage of gaseous isotope mixtures through the housing, a radiation zone which forms a cylinder surface around said slot nozzles, a radiation window in said housing for the passage of radiation into said radiation zone, a multiplicity of diffusers concentric with said cylinder surface of the slot nozzles arranged around said radiation zone, and at least one gas outlet in said housing for discharge of gases from said diffusers, and wherein the slot nozzles, as seen in the axial directions, consist of several individual lengths which are mounted and aligned relative to each other via dowel pins and centering rings.

2. Apparatus according to claim 1, wherein the diffusers are built-up from a multiplicity of stacked washer-like individual elements and can be adjusted or readjusted in their mutual position by resilient spacer elements as well as clamping elements.

3. Apparatus according to claim 1, wherein the diffusers are arranged with their openings axis-parallel to the slot nozzles.

4. Apparatus according to claim 1, wherein the diffusers are arranged with their openings axis-parallel to the slot nozzles, and wherein the diffusers are built up as individual elements with lateral spacings, are held together by clamping rings and are inserted in the housing centered.

5. Apparatus according to claim 3, wherein the diffusers are built up as individual elements with lateral spacings, are held together by clamping rings and are inserted in the housing centered.

6. Apparatus according to claim 4, wherein the individual elements consist of two walls which are connected at their radially outer side, are open opposite the slot nozzles and deflect the gas streams leaving the nozzles, and the space defined by these walls is in connection via openings in the housing with outlet openings for the discharge of said deflected gas streams.

7. Apparatus according to claim 5, wherein the individual elements consist of two walls which are connected at their radially outer side, are open opposite the slot nozzles and deflect the gas streams leaving the nozzles, and the space defined by these walls is in connection via openings in the housing with outlet openings for the discharge of said deflected gas streams.

8. Apparatus according to claim 1, wherein said housing is provided with a window of annular cross section for the entry of the radiation as well as with mirrors in its interior reflecting the radiation.

* * * * *